US009569218B2

United States Patent
Krig (10) Patent No.: US 9,569,218 B2
(45) Date of Patent: Feb. 14, 2017

(54) DECOMPOSING OPERATIONS IN MORE THAN ONE DIMENSION INTO ONE DIMENSIONAL POINT OPERATIONS

(75) Inventor: Scott A. Krig, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 602 days.

(21) Appl. No.: 13/992,279

(22) PCT Filed: Dec. 30, 2011

(86) PCT No.: PCT/US2011/068067
§ 371 (c)(1),
(2), (4) Date: Jun. 7, 2013

(87) PCT Pub. No.: WO2013/101173
PCT Pub. Date: Jul. 4, 2013

(65) Prior Publication Data
US 2013/0297908 A1    Nov. 7, 2013

(51) Int. Cl.
*G06F 15/16* (2006.01)
*G06F 9/30* (2006.01)
*G06F 9/38* (2006.01)

(52) U.S. Cl.
CPC ......... *G06F 9/30181* (2013.01); *G06F 9/3001* (2013.01); *G06F 9/38* (2013.01); *G06F 9/3887* (2013.01)

(58) Field of Classification Search
CPC ...................................... G06Q 30/02
See application file for complete search history.

(56) References Cited

U.S. PATENT DOCUMENTS

| 4,787,057 A * | 11/1988 | Hammond ............ G06F 17/16 |
| | | 708/607 |
| 4,922,544 A | 5/1990 | Stansfield |
| 5,841,890 A | 11/1998 | Kraske |
| 6,130,967 A | 10/2000 | Lee |
| 7,043,618 B2 * | 5/2006 | Barlow ............ G06F 9/30098 |
| | | 711/170 |
| 7,844,123 B2 | 11/2010 | Takakura |

OTHER PUBLICATIONS

PCT International Search Report and Written Opinion issued in corresponding PCT/US2011/068067 dated Sep. 17, 2012, (9 pages).

* cited by examiner

*Primary Examiner* — Cheng-Yuan Tseng
(74) *Attorney, Agent, or Firm* — Trop Pruner & Hu, P.C.

(57) ABSTRACT

A processing architecture uses stationary operands and opcodes common on a plurality of processors. Only data moves through the processors. The same opcode and operand is used by each processor assigned to operate, for example, on one row of pixels, one row of numbers, or one row of points in space.

20 Claims, 10 Drawing Sheets

Streaming Convolution (3x3 example)
Area Decomposition Transform: 3x3 Convolution Example, Sobel Horizontal Gradient

| | | |
|---|---|---|
| P1 = [x-1, y-1] | P2 = [x, y-1] | P3 = [x+1, y-1] |
| P4 = [x-1, y] | P5 = [x, y] | P6 = [x+1, y] |
| P7 = [x-1, y+1] | P8 = [x, y+1] | P9 = [x+1, y+1] |

| | | |
|---|---|---|
| K1 = -1 | K2 = -2 | K3 = -1 |
| K4 = 0 | K5 = 0 | K6 = 0 |
| K7 = 0 | K8 = 0 | K9 = 0 |

SET OPCODE REGISTER: MADD instruction, precision = 16-bits unsigned
    Multiply WORKING BUFFER w/OPERAND, ADD to CELL, STORE in CELL
SET OPERAND REGISTER: K1 coefficient value
WRITE ENTIRE IMAGE Image Offset = P1 ((MADD each memory CELL with OPERAND)

SET OPERAND REGISTER: K2 coefficient value
WRITE ENTIRE IMAGE Image Offset = P2 (MADD each memory CELL with OPERAND)

SET OPERAND REGISTER: K3 coefficient value
WRITE ENTIRE IMAGE Image Offset = P3 (MADD each memory CELL with OPERAND)

SET OPERAND REGISTER: K4 coefficient value
WRITE ENTIRE IMAGE Image Offset = P4 (MADD each memory CELL with OPERAND)

SET OPERAND REGISTER: K5 coefficient value
WRITE ENTIRE IMAGE Image Offset = P5 (MADD each memory CELL with OPERAND)

SET OPERAND REGISTER: K6 coefficient value
WRITE ENTIRE IMAGE Image Offset = P6 (MADD each memory CELL with OPERAND)

SET OPERAND REGISTER: K7 coefficient value
WRITE ENTIRE IMAGE Image Offset = P7 (MADD each memory CELL with OPERAND)

SET OPERAND REGISTER: K8 coefficient value
WRITE ENTIRE IMAGE Image Offset = P8 (MADD each memory CELL with OPERAND)

SET OPERAND REGISTER: K9 coefficient value
WRITE ENTIRE IMAGE Image Offset = P9 (MADD each memory CELL with OPERAND)

SET OPCODE REGISTER DIVIDE instruction, precision = 8-bits unsigned
    Divide each CELL by OPERAND, STORE result in CELL
SET OPERAND REGISTER: 9 (divide each pixel by 9)
WRITE ENTIRE IMAGE Image Offset = 0
CONVOLUTION FINISHED

FIG. 9

Streaming Mathematical Binary Morphology (3x3 example)

Area Decomposition Transform: 3x3 Dilation Erosion Example

*NOTE: This example assumes:

1. That the source image is prepared as a binary image with only black & white pixels, where black = 0 and white = 1

2. That coefficients (K1 .. K9) equal to zero (0) do not need to be written into CELLS, this is an optimization so we only need to write K2, K4, K6 and K8 into cells.

SET OPCODE REGISTER:          ANDADD instruction, precision = 8-bits unsigned
                              AND WORKING BUFFER w/OPERAND and CELL, STORE in CELL SET OPERAND REGISTER:         K2 coefficient value
WRITE ENTIRE IMAGE            Image Offset = P1 (ANDADD  each memory CELL with OPERAND)
SET OPERAND REGISTER:         K4 coefficient value
WRITE ENTIRE IMAGE            Image Offset = P2 (ANDADD  each memory CELL with OPERAND)
SET OPERAND REGISTER:         K6 coefficient value
WRITE ENTIRE IMAGE            Image Offset = P3 (ANDADD  each memory CELL with OPERAND)
SET OPERAND REGISTER:         K8 coefficient value
WRITE ENTIRE IMAGE            Image Offset = P4 (ANDADD  each memory CELL with OPERAND)
DILATION FINISHED

| P1 = [x−1, y−1] | P2 = [x, y−1] | P3 = [x+1, y−1] |
|---|---|---|
| P4 = [x−1, y] | P5 = [x, y] | P6 = [x+1, y] |
| P7 = [x−1, y+1] | P8 = [x, y+1] | P9 = [x+1, y+1] |

| K1 = 0 | K2 = 1 | K3 = 0 |
|---|---|---|
| K4 = 1 | K5 = 0 | K6 = 1 |
| K7 = 0 | K8 = 1 | K9 = 0 |

FIG. 10

Streaming MIN filter (3x3 example)

Area Decomposition Transform: 3x3 MIN Filter Example

| | |
|---|---|
| SET OPCODE REGISTER: | MINADD instruction, precision = 8-bits unsigned |
| | Minimum value of WORKING BUFFER and CELL -> CELL |
| SET OPERAND REGISTER: | DON'T CARE |
| WRITE ENTIRE IMAGE | Image Offset = P1 MINADD of WORKING BUFFER and CELL -> CELL |
| WRITE ENTIRE IMAGE | Image Offset = MINADD of WORKING BUFFER and CELL -> CELL |
| WRITE ENTIRE IMAGE | Image Offset = P3 MINADD of WORKING BUFFER and CELL -> CELL |
| WRITE ENTIRE IMAGE | Image Offset = MINADD of WORKING BUFFER and CELL -> CELL |
| WRITE ENTIRE IMAGE | Image Offset = MINADD of WORKING BUFFER and CELL -> CELL |
| WRITE ENTIRE IMAGE | Image Offset = P6 MINADD of WORKING BUFFER and CELL -> CELL |
| WRITE ENTIRE IMAGE | Image Offset = MINADD of WORKING BUFFER and CELL -> CELL |
| WRITE ENTIRE IMAGE | Image Offset = P8 MINADD of WORKING BUFFER and CELL -> CELL |
| WRITE ENTIRE IMAGE | Image Offset = P9 MINADD of WORKING BUFFER and CELL -> CELL |
| MIN FILTER FINISHED | |

| P1 = [x−1, y−1] | P2 = [x, y−1] | P3 = [x+1, y−1] |
|---|---|---|
| P4 = [x−1, y] | P5 = [x, y] | P6 = [x+1, y] |
| P7 = [x−1, y+1] | P8 = [x, y+1] | P9 = [x+1, y+1] |

| K1 = 0 | K2 = 1 | K3 = 0 |
|---|---|---|
| K4 = 1 | K5 = 0 | K6 = 1 |
| K7 = 0 | K8 = 1 | K9 = 0 |

FIG. 11

DECOMPOSING OPERATIONS IN MORE THAN ONE DIMENSION INTO ONE DIMENSIONAL POINT OPERATIONS

BACKGROUND

This relates generally to processing architectures and particularly to processing architectures adapted for parallel operations on a large amount of data.

In many processing applications, including those involving graphics and those involving complex mathematical calculations, a large number of simple operations must be done a large number of times. As a result, many of these operations can be done in parallel.

In a typical Von Neumann architecture, a processing pipeline is executed by a processor. In that pipeline, there are number of stages. Both data to be operated on and code to operate on that data, move through the pipeline in parallel. That is, both the instructions and the data move from stage to stage through the pipeline in the same way.

In image processing, there are a number of operations that are considered to be point operations. These operations are generally performed only on one pixel and only using that pixel's value. Thus, point operations can also be called one dimensional operations.

There are also operations that involve not only a pixel of interest but its immediate neighbors as well. These operations use the values of the pixel of interest and its neighbors. Thus, such image processing may be called group processing, area processing, or two-dimensional processing.

BRIEF DESCRIPTION OF THE DRAWINGS

Some embodiments are described with respect to the following figures:

FIG. 9 is an example of a transformation of a streaming convolution in one embodiment;

DETAILED DESCRIPTION

In some embodiments an instruction stream does not need to be fetched in contrast to the Von Neuman architecture. Instead, instructions and operands are preset into the control and operand registers, and only the data stream needs to be fetched. In some cases this is advantageous for speed of calculations and reduction of memory bandwidth requirements.

Figure 1:
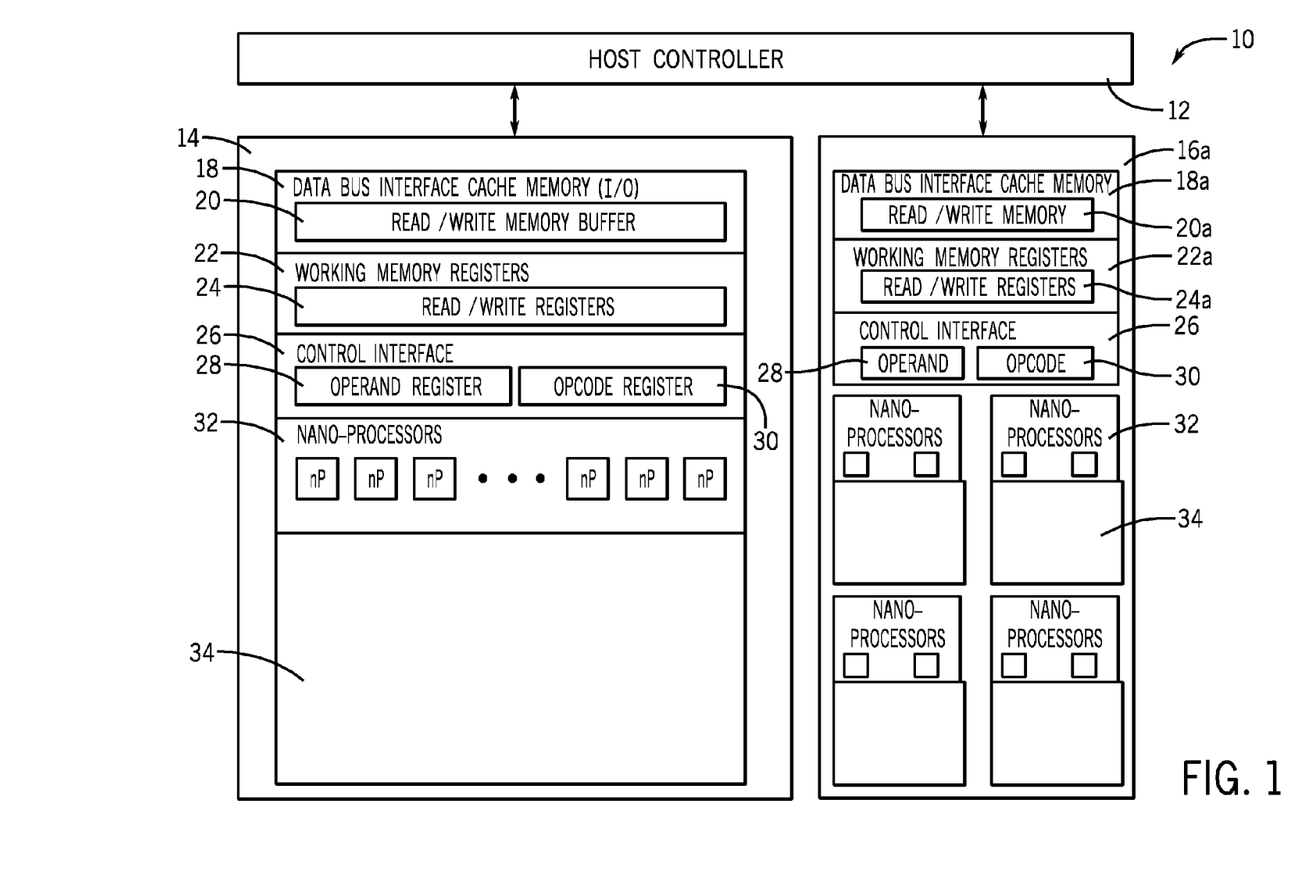
FIG. 1 is a hardware depiction of one embodiment.

Referring to FIG. 1, in accordance with one embodiment, a host controller 12 may be coupled to an orthogonal processor 14 and an orthogonal processor 16*a*. The difference between the two processors 14 and 16*a* is that one works on a smaller sized word than the other. Specifically, the orthogonal processor 14 in one embodiment works on 4 k words while the orthogonal processor 16*a* in one embodiment works on 16 k words. Other arrangements are also possible. Thus, there may be additional orthogonal processors, each adapted to different word sizes, and there is no limitation on the particular word sizes that any particular processor may be designed to operate on.

As used herein, an orthogonal processor refers to the fact that the data and instructions do not move through the processor along the same path. Instead, a given word of work is broken into a given number of bits to form a data word. A nanoprocessor is provided to operate on each of the groups of bits (data words) in parallel. Thus to operate on a 4 k word, there would be 4 k nanoprocessors in one embodiment. Each nanoprocessor may use a common or shared operating register 28 and a common opcode register 30 because each nanoprocessor is doing the same operation using the same operand as all the other nanoprocessors in a given orthogonal processor.

The output of each nanoprocessor 32 is stored in a row in the cell array 34 which is a two-dimensional memory with rows and columns. A nanoprocessor is any relatively small limited function or dedicated processor.

The way that these operations are implemented is equivalent to a direct memory access (DMA). Thus the operations occur at memory write speeds in some embodiments, and faster or slower in other embodiments.

Opcode register 30 stores an opcode that is then used by each nanoprocessor to operate on the input data. In some embodiments there may be more than one opcode that is applied to the data. Thus, in some embodiments more than one opcode register may be included. This results in the same data being operated on by more than one opcode. In some embodiments the opcode register 30 may store compound opcodes such as fused multiply add opcodes. In such cases, more than one opcode occurs together in the same instruction. Thus, the opcode register may include opcodes fused together to perform both a multiply and an add in the same instruction. Other fused operations include multiply and clip in the same instruction, and add and clip in the same instruction using a plurality of opcode registers. Other compound opcodes may also be used.

Figure 2:
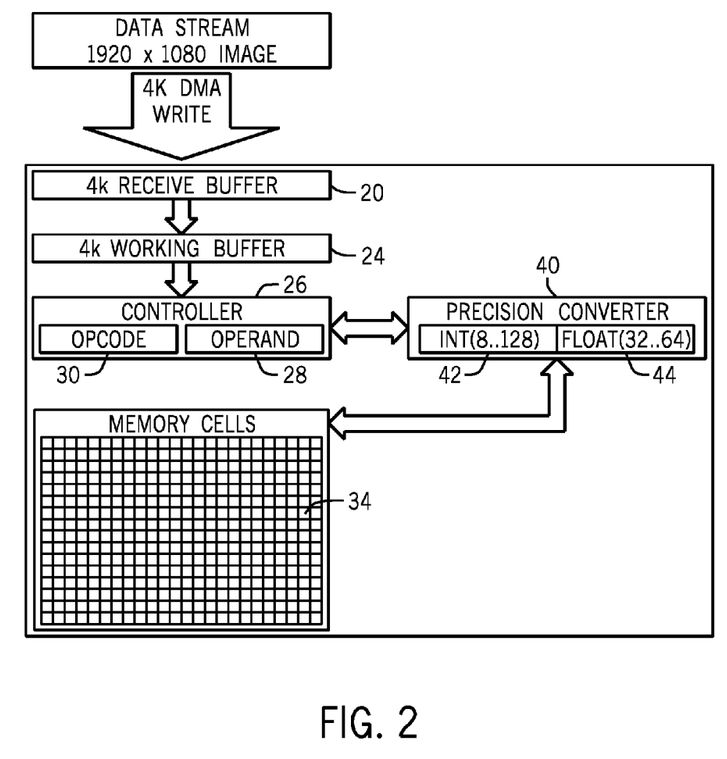
FIG. 2 is a sequential depiction of a write operation according to one embodiment.

Referring to FIG. 2, in an orthogonal processor, data moves in the vertical direction and operands and opcodes are moving or set into one or more operand and opcode registers in the horizontal direction in each nanoprocessor. The operands and opcodes are stored before the data flow begins.

Thus the sequence may be, in one embodiment, to provide a word of data having a number of bits equal to the number of nanoprocessors. Each nanoprocessor has access to the particular operands and the particular opcodes to be executed any given number of times. Thus a two-dimensional array of data may include a number of horizontal rows of data. Each row may be processed serially, one after the other. Therefore the nanoprocessors do not need to receive new opcodes or operandsuntil after the entire two-dimensional array has been processed.

Once each nanoprocessor has access to the correct operands and the correct opcodes and has the data ready to operate on, the operation is implemented. For example if the operation is a multiply, each nanoprocessor does the multiplication and loads the data into a row of the cell array 34. Thus the operations are done effectively at write speeds corresponding to direct memory accesses. Each cell in the array stores the result of the operation performed on one bit or data word, such as one pixel in a graphics application.

The host controller feeds the data to each orthogonal processor 14 or 16a as the case may be. Thus if a given set of operations uses words of one size, the data may be provided to the processor 14, and if the data is of a different size it may be provided to a processor 16a adapted to that particular size.

Typically, embodiments of the present invention operate on point operations which are basically one-dimensional. A multiply or an add is an example of a point operation. Area operations involve two or more dimensions and correspond to things like kernel operations, convolutions, and binary morphology, and one skilled in the art will recognize that this invention may be embodied in multiple dimensions.

Applications for two-dimensional operations include discrete convolution and kernel operations include media post-processing, camera pipeline processing, video analytics, machine vision and general image processing. Key operations may include edge detection and enhancement, color and luminance enhancement, sharpening, blurring, and noise removal.

Applications of binary morphology and gray scale morphology as two-dimensional area operations include video analytics, object recognition, object tracking and machine vision. Key operations performed in the orthogonal processor may include a erode, dilate, opening and closing.

Applications for numeric area and point operations include any type of image processing including those described above in connection with discrete convolution, kernel operations, and binary morphology. Key operations include math operators, Boolean operators applied to each point or pixel and numeric precision data type conversions.

In some embodiments area operations are converted into point operations, where area operations may be two or three cubic, or higher dimensions, and the reduction of said area operations into one-dimensional point operations is advantageous in some embodiments reducing the computational and memory bandwidth overhead for all point operations. For example, a convolution is an area operation that can be converted into a series of successively shifted multiplications with accumulation, which are simple one-dimensional point operations that are accelerated. Then in the first passthrough an orthogonal processor, a shift in the dataset origin is implemented and in the second pass, a multiplication may be implemented with accumulation on a shifted version of the source dataset.

By decomposing the computation into a set of point operations implemented as a set of DMA or other memory writes, the data set may be kept in a local cache portion of the memory hierarchy and thus be much more efficient in terms of memory bandwidth, system performance, and lower power in some embodiments.

In a more specific example, the operation may be accumulation or summing. Each orthogonal processor cell is an accumulator that sums the results of each memory write into itself by combining the write value or operand according to an opcode. Only a write into memory is needed for the memory cell to perform the computation. At page writes and corresponding vectorization of computations such as 4,096 page writes and 4,096 vectorized operations may occur a direct memory access speeds. In this example, the memory cell is the accumulator for a set of sequential operands, and the cumulative result of a set of operations is accumulated in the memory cell, for example, a set of nine (9) MULTIPLY-ADD instructions used to implement a convolution kernel where the result is accumulated into the memory cell.

The memory cell may also used as an operand for some operations or opcodes. An opcode may take as an input a memory cell and an operand from a register, where the result is stored into the memory cell, for example, as may be the core with a MULTIPLY-ADD instruction.

Each nanoprocessor may operate as follows in one embodiment. For each opcode, the operation bit precision and numeric conversion is defined. Assuming a 32-bit opcode embodiment, there are zero to fifteen bits to define the opcode and sixteen to twenty-one bits to define the precision and conversion of the operation. The decoding of the instructions may occur in an orthogonal path to the data path.

Accumulation may effectively be done in the cell array 34. Opcodes may be implemented in the nanoprocessors 32 and numeric conversions may occur on read or write to each memory cell. Each memory cell applies a data format conversion operation as follows. For read operations, the cell numeric format is converted on memory read using a convert operator. Numeric conversions can be specified using opcodes to set up the nanoprocessors prior to the memory reads or writes to enforce the desired data conversion and numeric precision. The numeric conversions are implicit and stay in effect until a new opcode is sent to the nano processors. For write operations, a final value is converted to a desired numeric format according to the convert operator. This allows any sort of common operation to be implemented such as area convolution, other types of mathematical area operations, point operations, binary morphology and gray scale morphology, with options available to be set into control or opcode registers to specify the numeric conversions between float, double, and integer. In some embodiments precision may be fixed or limited to save silicon real estate and to reduce power consumption.

The cell array is an array of memory cells or registers with attached compute capabilities in the form of the nanoprocessors shown in FIG. 1. Each memory cell is also an accumulator storing results with varying precision calculated by the nanoprocessors. Cell array processing occurs at the speed of memory writes eliminating memory reads for kernels and source pixels and providing vectorized processing at the speed of direct memory access writes into the cell array in some embodiments.

The array can be used simply for data conversions instead of calculations, since data conversions are very common, and the array can accelerate them.

An array can also be used for memory read operations simply for numeric conversions via DMA reads, since the numeric conversions are fast and occur at DMA rates with no need for processing the data. The numeric conversions may be between integer and floating point, various integer lengths, and various floating point lengths using sign extension, rounding, truncation, and other methods as may be desired and set using opcodes.

The cell array operation is similar to a hardware raster operation in a display system. In a display system, the raster operations are applied for each pixel written into a display memory cell or pixel.

Standard area operations like convolution may be broken down into point operations, allowing the computations to be performed as a series of DMA writes at very high performance in some embodiments.

For example in connection with a convolution, a series of pixel offset writes can occur into the orthogonal processor memory cells where the desired operation for each pixel may occur within the nanoprocessors that act on the individual cells. Each kernel value is preset into the cell array operand register prior to the pixel blit. The cell array operates by simply writing the entire image which causes the nanoprocessors to perform convolution operations for each pixel. This arrangement transfers pixel by pixel area convolution into a vectorized write operation, eliminating kernel and pixel reads and performing a fused multiply-add accumulation in each cell. In an embodiment, if the memory system employs cache memory levels and the data set resides in the cache at all times or even most of the time, this method will exploit cache memory and thus provide additional power & performance advantages.

Figure 6:
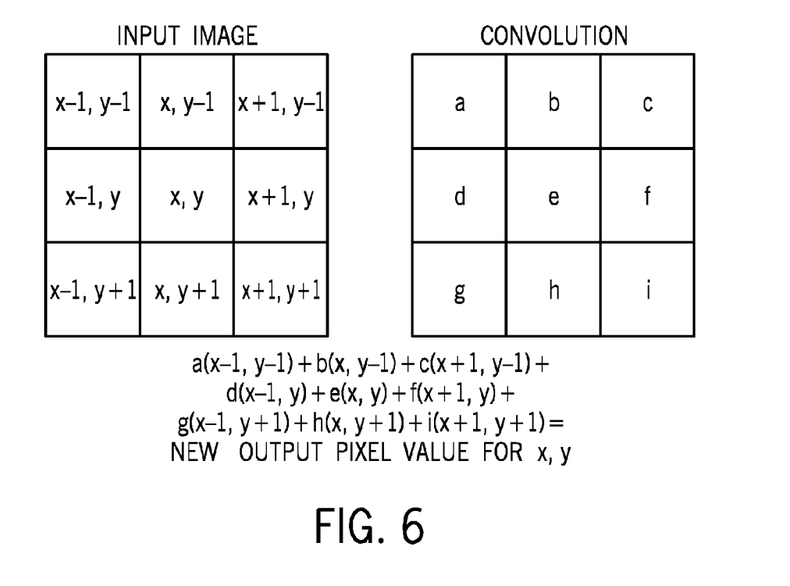
FIG. 6 is an illustration of a spatial convolution.

Referring to FIG. 6, spatial convolution is performed as a summation of elements multiplied by constants. In the case of an image processing application, the elements are pixel brightnesses of a kernel. A kernel is the input pixel plus its immediate neighbors. The number of immediate neighbors is variable. For example 3×3, 5×3, or any odd numbered array of pixels around the pixel of interest may be chosen. The constants are weights or convolution coefficients. A convolution mask is an array of convolution coefficients.

Thus, in FIG. 6, a 3×3 array of pixels is illustrated. In this case a 3×3 convolution will be done of the central pixel x, y as an example. Convolution coefficients a through i make up a convolution mask. Thus each of the convolution coefficients is used in a multiply and accumulate operation with its corresponding pixel location. That is, as an example, the convolution coefficient a corresponds to the pixel position x−1, y−1 in this example. Then the convolution is the sum of the multiplications of each convolution coefficients times its corresponding input image pixel. The result is a new output pixel value for the pixel x, y. The specific multiplication and accumulation operations for this example are also shown in FIG. 6.

Then in order to perform the convolution of the next pixel, the convolution mask can simply be shifted by one to the left or the right or up or down successively until all the pixels in the input image have their convolution determined. The shift operation can be effectively accomplished with the memory array and associated nanoprocessors. Particularly, the multiply and add and shift can all be done in this example using nine pixel writes to the memory array. This is a considerable simplification relative to existing techniques.

Figure 7:
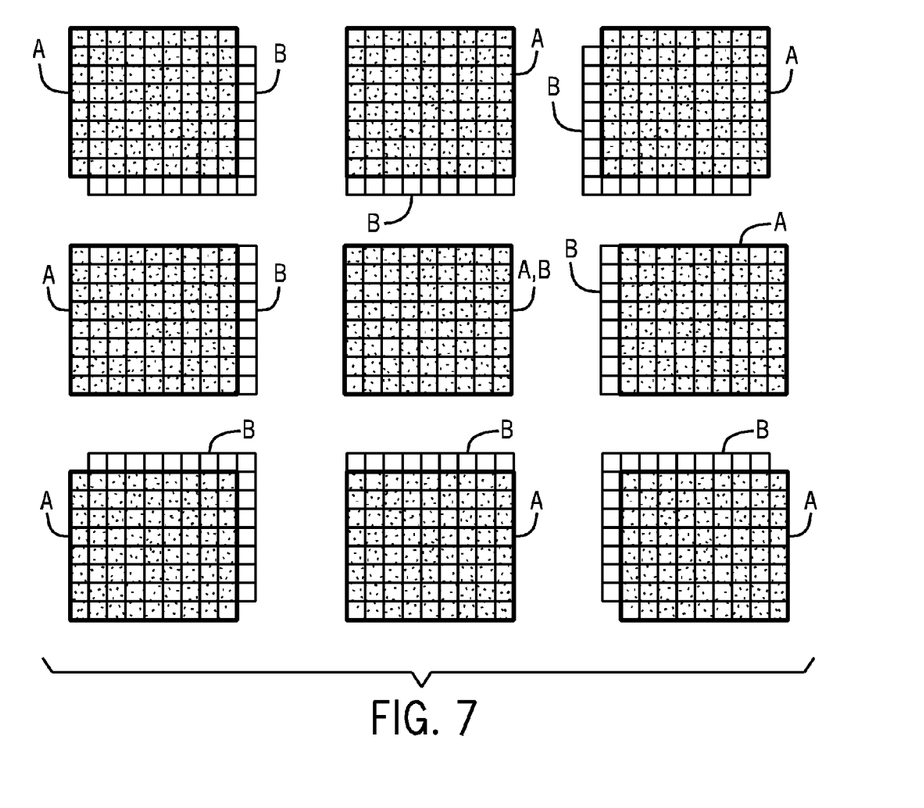
FIG. 7 is a functional depiction of one embodiment.

The shifting operation is also shown in FIG. 7. The convolution mask is B and the kernel is A in FIG. 7. A larger portion of the array is shown because more neighboring pixels, than what is shown in FIG. 6, are involved. As can be seen, the entire group of pixels shown in FIG. 6, nine in number, can be subjected to convolution by nine shifts each with nine multiply and addition operations.

Figure 8:
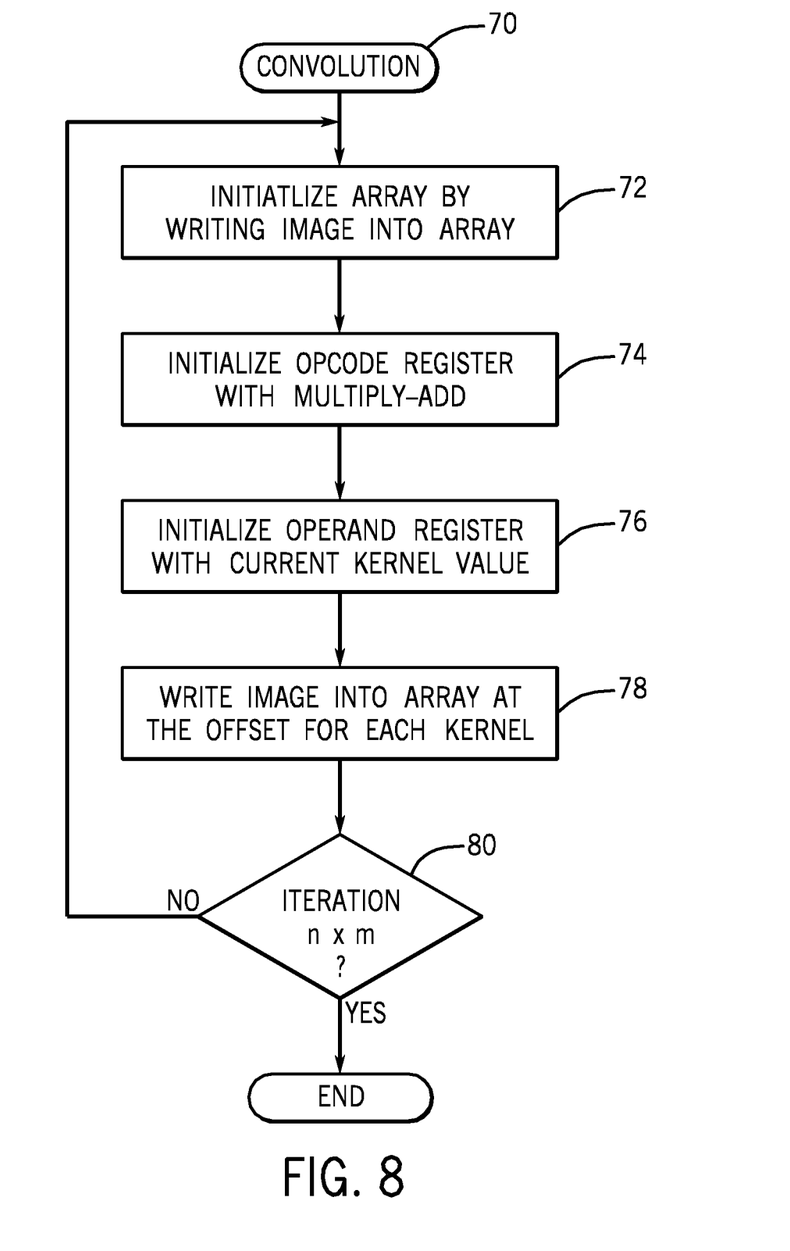
FIG. 8 is a flow chart for one embodiment.

Finally referring to FIG. 8, a convolution sequence 70 may be implemented in software, firmware and/or hardware. In software and firmware embodiments it may be implemented by computer executed instructions stored in a non-transitory computer readable medium such as a semiconductor, magnetic, or optical storage.

Initially, as stated in block 72, the array is initialized by writing the image pixels into the array. Then the opcode register is initialized as multiply as indicated in block 74. The operand register is initialized with the current kernel value as indicated in block 76. Next the entire image is written into the array at the offset for each kernel as indicated in block 78. A check at diamond 80 determines whether all the necessary iterations have been done. The number of iterations is determined by the size of the array. Thus in the example given in FIG. 6, nine iterations would be needed.

The orthogonal processor may perform 3×3 convolution with nine pixel writes of the image frame onto itself and offsets according to the kernel size, eliminating explicit read operations. In contrast a normal 3×3 convolution involves nine kernel reads, nine pixel reads and nine fused multiply-add instructions for each pixel in addition to a final pixel write. Thus the orthogonal processor may provide a significant speed-up in some embodiments. The pseudo code for 3×3 convolution using nine image frame writes plus kernel set-up is as follows:

```
sobel[3][3] =
   {
   {−1, −2, −1,}
   { 0, 0, 0,}
   { 1, 2, 1}
   };
// Initialize cells by writing entire image into XCELLARRAY
writeImage(source_image, &xcellarrray.memory, /*X OFFSET*/ 0,
   /*Y OFFSET */ 0);
// Initialize opcode register with MULTIPLY
Xcellarray.opcode = OP_MULTIPLY;
// Iterate 9 times to write the entire image, one line at a time, into
the memory array
// and for each write, use a different kernel value
XSIZE = 3;
YSIZE = 3;
XOFFSET = (XSIZE / 2);
YOFFSET = (YSIZE / 2);
for (x=0; x < XSIZE; x++)
   {
      for (y=0, y < YSIZE; y++)
      {
      // Initialize operand register with the current kernel value [x,y]
      Xcellarray.operand[0] = sobel[x,y];
      // Write source image into cell array at the offset for each
      kernel element
      // This Write performs a MADD instruction −> CELL +=
      (CELL * operand)
      writeImage(source_image, &xcellarrray.memory, x −
      XOFFSET, y − YOFFSET);
      }
   }
```

A pictorial illustration of the transformation of a streaming convolution is shown in FIG. 9.

The example below shows pseudo-code for a 3×3 morphological DILATE operation illustrating the cell array optimization method according to one embodiment.

```
dilate[3][3] =
{
{0, 1, 0,}
{1, 0, 1,}
{0, 1, 0}
};
// Initialize cells by writing entire image into
writeImage(source_image, &xcellarrray.memory, /*X OFFSET*/ 0, /*Y
OFFSET */ 0);
// Initialize opcode register with MULTIPLY
Xcellarray.opcode = OP_OR; // Boolean OR
// Iterate 9 times to write the entire image into the memory array
// and for each write, use a different kernel value
XSIZE = 3;
YSIZE = 3;
XOFFSET = (XSIZE / 2);
YOFFSET = (YSIZE / 2);
for (x=0; x < XSIZE; x++)
{
   for (y=0, y < YSIZE; y++)
   {
      // OPTMIIZATION: for DILATE, we only use truth values of 1
      (ignore 0) if (dilate[x,y] != 0)
      {
         // Initialize operand register with the current kernel value
         [x,y] Xcellarray.operand[0] = dilate[x,y];
         // Write source image into memory array at the offset for
each kernel element
         // This Write performs a MADD instruction −> CELL +=
```

```
        (CELL * operand)
            writeImage(source_image, &xcellarrray.memory, x -
XOFFSET, y - YOFFSET);
        }
    }
}
```

Figure 10:
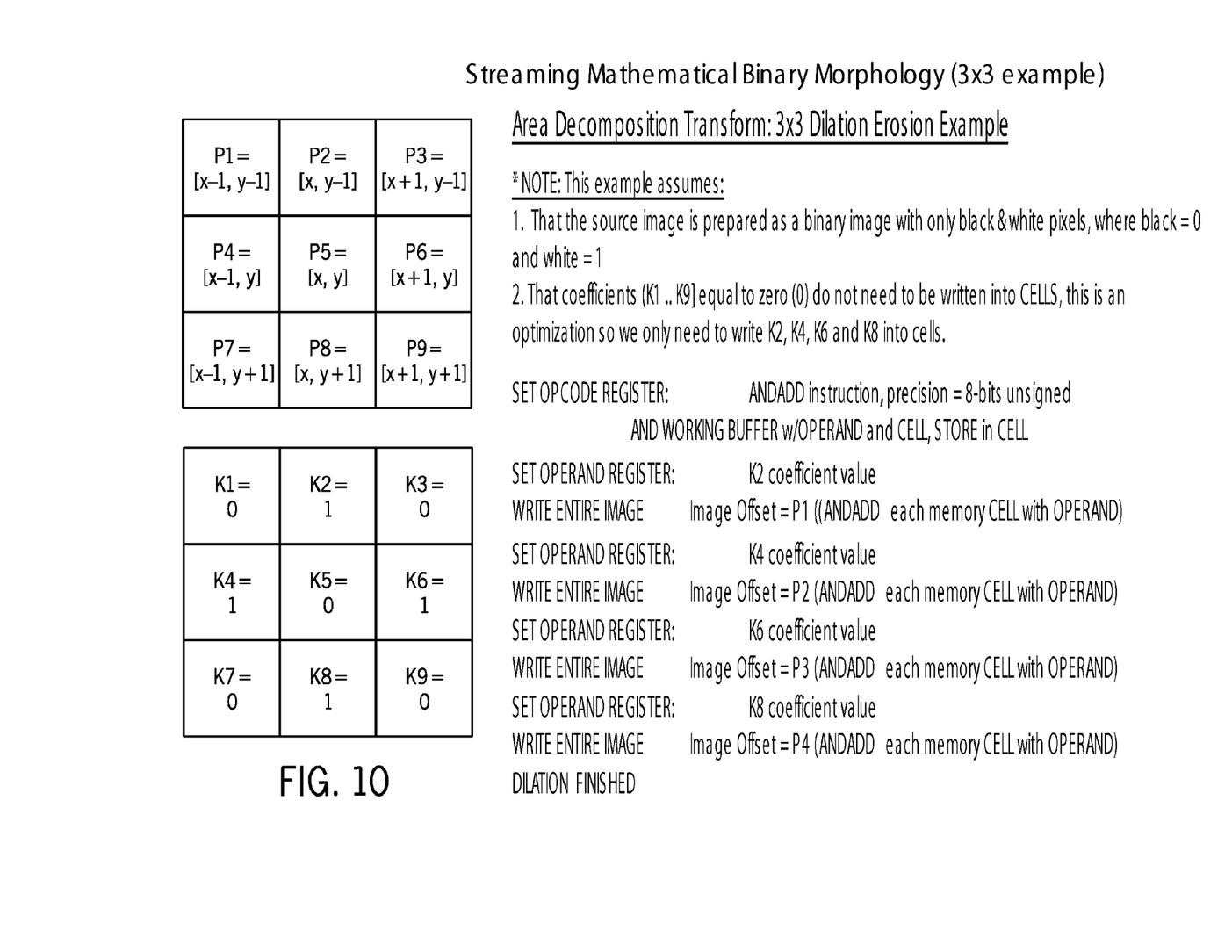
FIG. 10 is an example of a transformation of streaming mathematical morphology into one embodiment.
Figure 11:
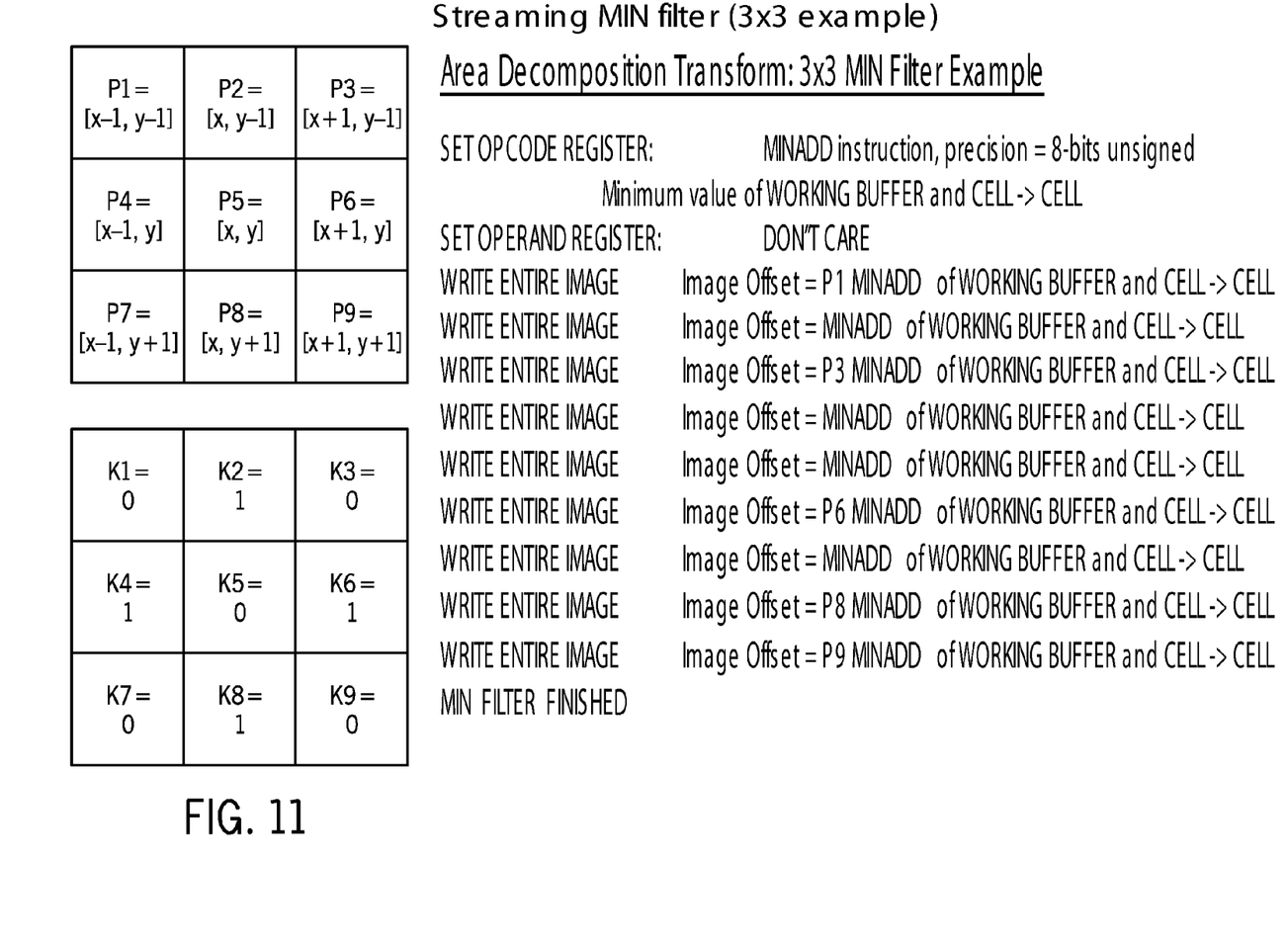
FIG. 11 is an example of a transformation of a streaming MIN filter in one embodiment.

An example of a transformation of streaming mathematic morphology is shown in FIG. 10 and an example of the transformation of a streaming MIN filter is shown in FIG. 11.

Each cell in the memory 34 contains the following three features:
1) accumulation or summing into the cell, 2) operations or opcodes that act on the cell and a set of operands in programmable registers, and 3) numeric and data format conversions between various integer and floating point data types and bit resolutions.

In an embodiment, a specific set of opcodes may be implemented as needed to suit a specific task, including mathematical operations, Boolean logic operations, logical comparison operations, data conversion operations, transcendental function operations, or other operations that may be devised by one skilled in the art.

The nanoprocessors provide a set of mathematical and logical operations and numeric format conversions using an input operand and the current cell value accumulated in the cell as shown below in equation 1, where one or more operands may be used in an embodiment:

$$\text{Cell} = \text{Precision}(\text{Opcode}(\text{Cell}*\text{Operand1} \ldots \text{Operand}n)) \quad \text{Equation 1:}$$

where:
Cell=existing value of the memory cell
Operand1 . . . n: values to combine with the cell value via the opcode
Opcode: *math (+,−,*,/, ||, . . . ) or Boolean (AND, OR, NOT, XOR) result accumulated in cell
Precision: numeric format conversions int(8,10,12,14,16, 24,32,64), float(24,32,64), etc.

Each memory cell is an accumulator, and sums the results of each memory write into itself by combining the write value (operand) according to an opcode. Only a write into memory is needed for the memory cell to perform the computations, which allows DMA rate page writes and corresponding vectorization of computations, such as 4096 page writes and 4096 vectorized operations.

An opcode may use one or more operands. For example, a Write opcode operation using a single operand may include the following instruction format:
MADD cell=(cell*in+cell)
ADD cell=(cell+in)
SUBTRACT cell=(cell−in)
MULTIPLY cell=(cell*in)
DIVIDE cell=(cell/in)
XOR cell=(cell^in)
OR cell=(cell|in)
AND cell=(cell*in)
NOR cell=(!(cell|in))
NAND cell=(!(cell*in))
CONVERT (INT<−>FLOAT, resolution, truncation, etc.—this is a part of opcode)
OPERAND (the incoming value being written into the cell)
An example of an opcode using multiple operands in an embodiment could be an ADDCLIP instruction as follows:

| ADDCLIP | OPERAND1 | OPERAND2 | CELL |
|---------|----------|----------|------|

Where:
OPERAND1=value to add to the cell
OPERAND2=value to clip the addition result, so that the result cannot be larger than OPERAND2
CELL=the memory cell where the addition result is stored
And the equation or pseudo code showing this operation is:

```
RESULT = CELL + OPERAND1
IF (RESULT > OPERAND2) RESULT = OPERAND2 // clipped result
CELL = RESULT
```

Each memory cell applies a data format conversion operation using the convert operation as follows. For read operations convert cell numeric format on memory read using convert operation. For write operations convert final value to desired numeric format according to convert operator. This allows any sort of common operation to be implemented such as area convolution, point operations, binary morphology, numeric conversions between float, double, int, etc.

In some embodiments, multiformat read and multiformat writes may be supported. This allows various numeric precisions to be used and converted on the fly. Numeric formats may include integer and float of various bit sizes. In one embodiment, only a subset of the numeric formats may be implemented to save silicon real estate and reduce power consumption. For example, one embodiment may support only integer (8, 12, 16, 32 bits) and float (24, 32 bits) numeric formats and conversions.

Each cell may store numeric data in an appropriate canonical numeric format to support the numeric conversions. The canonical format may vary in some embodiments.

Each memory cell in the array may have a dedicated nanoprocessor. However in other embodiments, a single vector of nanoprocessors corresponding to the memory page width may be shared among all the cells to support direct memory access page writes of 4,096 words together with the necessary processing. Thus some embodiments allow a single vector processing unit of a given size to be shared among vectors of memory cells rather than actually providing a dedicated nanoprocessor at each cell.

FIG. 2 shows a streaming calculation by a direct memory access write operation. In this example, the data stream may be a 1920×1080 image. A portion of the width of the image, in one embodiment a 4K portion, is written to the receive buffer 20 as indicated by the write arrow in FIG. 2. That 4K chunk is then moved to the working buffer 24 and another 4K chunk may be read across the width of the data stream to get it ready for subsequent operations in the controller. In the controller 26, there may be in one embodiment be 4K nanoprocessors each with an opcode 30 and an operand 28. Thus, a controller may include a nanocontroller for each bit of the chunk in one embodiment. It may also transfer each bit to the precision converter which changes either the precision or the type of data from integer to float or from float to integer. Then the data is stored into a row of memory cells in the memory array 34.

Figure 3:
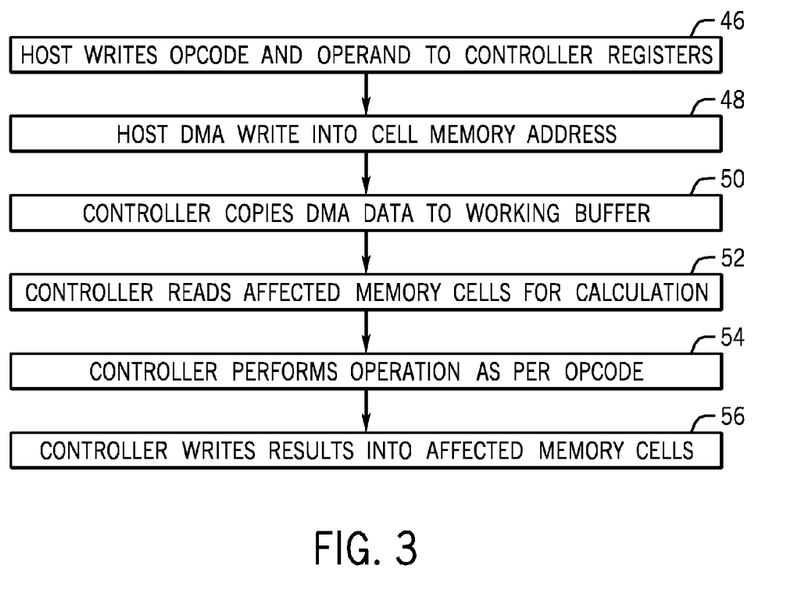
FIG. 3 is a flow chart for the write operation in one embodiment.

Thus referring to FIG. 3, a sequence may be implemented in hardware, software and/or firmware. In software and firmware embodiments it may be implemented by computer executed instructions stored in a non-transitory computer readable medium such as an optical, magnetic or semiconductor memory. For example, the sequence of instructions may be stored in the controller 26 in FIG. 2 in one embodiment.

The sequence begins when the host controller 12 (FIG. 1) writes the opcode and operand to the controller 26 registers as indicated in block 46. The block code contains a bit precision information. In some embodiments, there may be multiple operands.

Then the host does a DMA write into a cell memory address as indicated in block 48. More particularly data may be copied into a receive buffer for calculations prior to going into the cell memory.

Next the controller 26 copies the DMA data into the working buffer 24 in FIG. 2 as indicated in block 50. Next the controller reads the effected memory cells 34 to implement the calculation (block 52). Precision conversion may occur as set forth in the particular opcode.

Next the controller performs the operations specified by the opcode as indicated in block 54. He uses the operands and memory cells as specified in the opcode in some embodiments. Finally the controller 26 writes the result into the effected memory cells as indicated in block 56.

Figure 4:
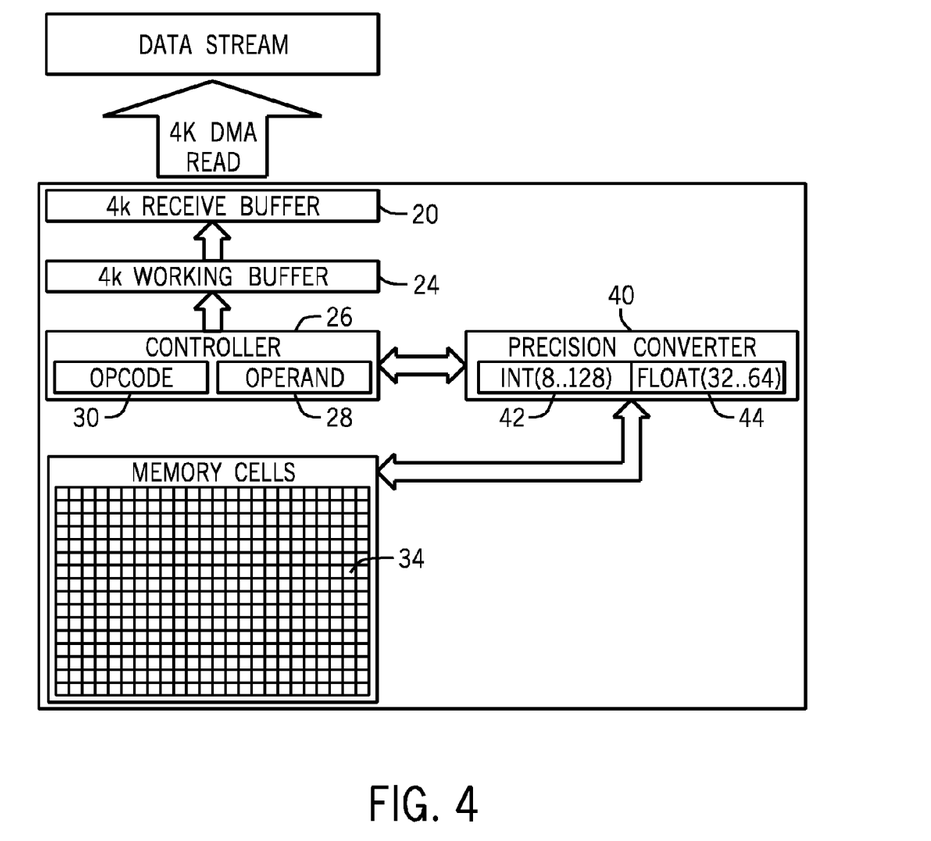
FIG. 4 is a sequential depiction of a read operation according to one embodiment.

The same thing can be done in the reverse order by using a DMA read operation for data format conversion. Thus looking at FIG. 4, data may be read from the memory cells to the precision converter and passed by the controller to the working buffer 24 to receive buffer 20 and then read out to form a data stream.

Figure 5:
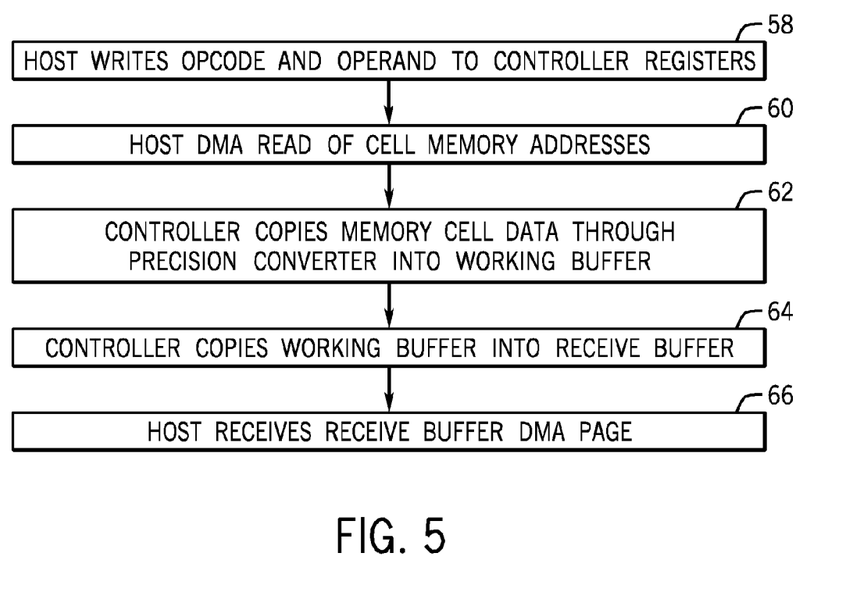
FIG. 5 is a flow chart for a read operation in one embodiment.

Referring to FIG. 5, the sequence for a streaming data format conversion using a DMA read operation may be implemented in software, firmware and/or hardware. In software and firmware embodiments it may be implemented by computer executed instructions stored in a non-transitory computer readable medium such as semiconductor, optical or magnetic storage. In some embodiments the sequence may be part of the controller 26.

The sequence begins when the host writes opcodes and operands to the controller registers as indicated in block 58. Then there is a host DMA read of the cell memory addresses as indicated in block 60.

Thereafter the controller copies (block 62) memory cell data through the precision converter 40 into the working buffer 24. Next the controller copies a working buffer into the receive buffer as indicated in block 64. Finally the host receives the receive buffer 20 DMA page as indicated in block 66.

While the 4K chunk is used in one embodiment, other chunk sizes may of course be used. The controller then performs the operation on each bit of the chunk in one embodiment.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   converting processor-based operations in more than one dimension into a series of one dimensional operations;
   programming a plurality of parallel processors with the same operand and the same opcode;
   performing a plurality of parallel operations using each of said processors and said operand to generate results and storing the results from each processor in one line in a memory;
   providing only one parallel processor for each row of pixels in a frame; and
   providing two processors, one to process words of a first size and the other to process words of a second size.

2. The method of claim 1 including converting an area operation into a series of one dimensional operations.

3. The method of claim 2 including converting an area operation into point operations implemented by memory writes into memory cells.

4. The method of claim 3 including combining a value of a first memory cell of said memory cells with an operand according to a processing opcode and accumulating results back into the first memory cell.

5. The method of claim 1 including performing a precision and numeric conversion in said processors.

6. The method of claim 1 wherein moving only data, and not instructions, along a processing pipeline.

7. The method of claim 1 including providing a storage and accumulation cell in said memory for each pixel.

8. The method of claim 7 including enabling each processor to perform both a point operation and an accumulation into the storage cell.

9. A non-transitory computer readable medium storing instructions to implement a method comprising:
   converting operations in more than one dimension into a series of one dimensional operations;
   programming a plurality of parallel processors with the same operand and the same opcode;
   performing a plurality of parallel operations using each of said processors and said operand to generate results and storing the results from each processor in one line in a memory;
   providing only one parallel processor for each row of pixels in a frame; and
   providing two processors, one to process words of a first size and the other to process words of a second size.

10. The medium of claim 9 including converting an area operation into a series of one dimensional operations.

11. The medium of claim 10 including converting an area operation into point operations implemented by memory writes into memory cells.

12. The medium of claim 11 including combining a value of a first memory cell value of said memory cells with an operand according to a processing opcode and accumulating results back into the first memory cell.

13. An apparatus comprising:
   a plurality of parallel processors, including only one parallel processor for each row of pixels in a frame;

a processor to convert operations in more than one dimension into a series of one dimensional operations, to program a plurality of parallel processors with the same operand and the same opcode, and to perform a plurality of parallel operations using each of said processors and said operand to generate results and storing the results from each processor in one line in a memory, and convert an area operation into a series of one dimensional operations; and a storage coupled to said processor.

14. The apparatus of claim 13, said processor to convert area operations into a series of one dimensional operations.

15. The apparatus of claim 14, said processor to convert an area operation into point operations implemented by memory writes into memory cells.

16. The apparatus of claim 15, said processor to combine a value of a first memory cell of said memory cells with an operand according to a processing opcode and accumulating results back into the first memory cell.

17. The apparatus of claim 13 including a plurality of parallel processors programmed with the same operand and the same opcode, said processors to perform a plurality of parallel operations using each of said processors and said operand to generate results and store the results from each processor in one line in a memory.

18. The method of claim 1 including providing a processor for each memory cell in a two dimensional array of memory cells.

19. A method comprising:
converting processor-based operations in more than one dimension into a series of one dimensional operations;
programming a plurality of parallel processors with the same operand and the same opcode;
performing a plurality of parallel operations using each of said processors and said operand to generate results and storing the results from each processor in one line in a memory;
providing only one parallel processor for each row of pixels in a frame; and
providing a two-dimensional array of processors, one for each pixel in an image to be processed.

20. A method comprising:
converting processor-based operations in more than one dimension into a series of one dimensional operations;
programming a plurality of parallel processors with the same operand and the same opcode;
performing a plurality of parallel operations using each of said processors and said operand to generate results and storing the results from each processor in one line in a memory;
providing only one parallel processor for each row of pixels in a frame; and
providing a processor for each memory cell in a two dimensional array of memory cells.

* * * * *